United States Patent [19]
Lundahl

[11] 3,898,786
[45] Aug. 12, 1975

[54] AIR DELIVERY FOLIAGE WAGON

[75] Inventor: Ezra Cordell Lundahl, Providence, Utah

[73] Assignee: Ezra C. Lundahl, Inc., Logan, Utah

[22] Filed: Jan. 24, 1974

[21] Appl. No.: 436,286

[52] U.S. Cl. .................................. 56/344; 214/522
[51] Int. Cl.² ......................................... H01D 87/00
[58] Field of Search ............................ 56/12.8–13.4, 56/341, 344, 345, 346; 214/520–522

[56] References Cited
UNITED STATES PATENTS

| | | | |
|---|---|---|---|
| 2,133,143 | 10/1938 | Innes | 56/364 |
| 2,513,480 | 7/1950 | Heth | 56/364 X |
| 2,675,808 | 4/1954 | Hecht | 56/13.3 X |
| 3,372,535 | 3/1968 | McCunn et al. | 56/13.3 |
| 3,732,672 | 5/1973 | Adee et al. | 56/13.3 |
| 3,744,228 | 7/1973 | Lundahl | 56/344 |
| 3,766,725 | 10/1973 | Marsh | 56/364 |
| 3,813,861 | 6/1974 | Wood | 56/344 |

FOREIGN PATENTS OR APPLICATIONS

| | | | |
|---|---|---|---|
| 737,175 | 6/1966 | Canada | 56/13.3 |
| 1,063,288 | 3/1967 | United Kingdom | 56/13.3 |

*Primary Examiner*—Russell R. Kinsey
*Attorney, Agent, or Firm*—Lynn G. Foster

[57] ABSTRACT

An air delivery wagon for foliage crops wherein air under pressure is created at a source with flow of pressurized air being directed along one or both of two channels communicating respectively with the foliage influent end and a site well above the influent end of a generally vertically extending telescopic chute, which chute discharges foliage from an elevated site into a receptacle comprising the bed of the wagon. The chute telescopically expands and contracts with the elevating and lowering of a compactor in respect to a stack of foliage or crop on the bed of the wagon. Dampers are used to control how much, if any of the air is discharged along either channel. The chute is substantially the full width of the wagon extending generally vertically directly above the foliage pick up site, allowance being made for gradual expansion of the cross sectional area of the chute for improved leaf retention and air flow.

19 Claims, 7 Drawing Figures

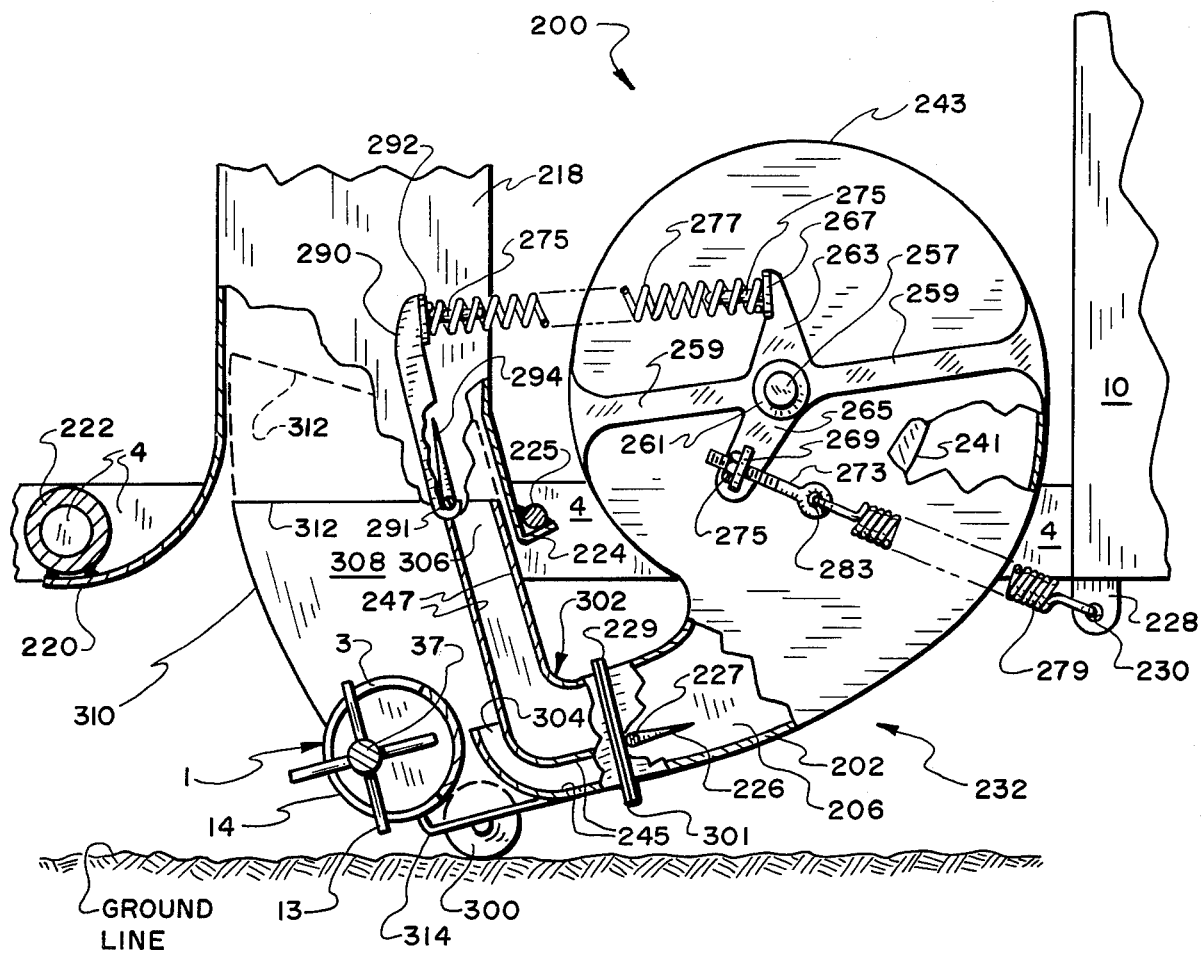
FIG. 5
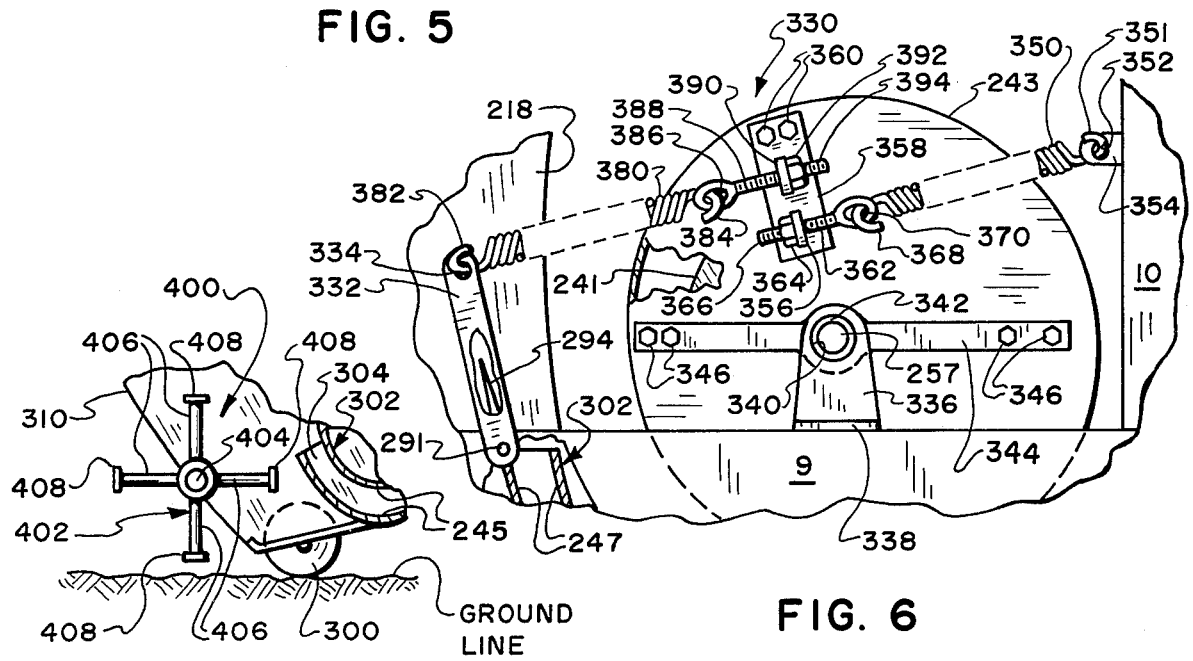
FIG. 7
FIG. 6

AIR DELIVERY FOLIAGE WAGON

BACKGROUND

1. Field of Invention

This invention relates generally to a foliage pick up and delivery system and is particularly directed to a pneumatic delivery foliage wagon having air flow controls and related methods.

2. Prior Art

Pneumatic or air delivery systems are frequently employed for delivery of crop material, such as hay or grain, into and out of wagons, trucks, railroad cars, ships, storage elevators, processing plants and the like. Conventionally, in such systems, a high velocity flow of air is established through a duct system extending along the desired delivery route and the crop material to be delivered is introduced into the air flow and is carried thereby to the desired delivery point. Numerous techniques have been employed heretofore for introducing the crop material into the air flow. Some systems have employed mechanical devices for introducing the crop material into the impellers or fans. However, such devices are subject to jamming and wear and require considerable maintenance. Other systems have employed vacuum techniques for drawing the crop material into the air flow. However, the air movement in such systems is generally extremely turbulent with the result that, where hay is being delivered, the leaves are frequently torn from the stems. Thereafter, during ejection of the hay at the delivery point, the leaves and stems become separated, since the stems are considerably heavier than the leaves. As a result, the ratio of leaves to stems varies significantly across the area into which the hay is discharged. Such separation is undesirable since, where the hay is used to feed livestock, the nutritional value of the hay varies with the proportion of leaves. Similarly, where the hay is to be pelletized to produce feed products, a non-uniform product will result. Moreover, such turbulence provides non-uniform introduction of the crop material into the air flow and tends to produce clogging of the intake which reduces or blocks the rate at which the crop is introduced into the air flow.

It is also customary, in prior art air delivery systems, to slam the crop against a circuitous passageway and to gradually decrease the cross-sectional area of the duct along the length thereof in order to maintain air pressure throughout the delivery system. However, the circuitous passageway and the reduction in area increases the likelihood of collision between the crop material and the passageway and between adjacent crop particles carried by the turbulent air flow. These factors tend to increase the damage to the crop material and stop the free flow of air in an expanding manner.

BRIEF SUMMARY AND OBJECTS OF THE INVENTION

These disadvantages of the prior art are overcome with the present invention and a novel air delivery foliage crop wagon and related methods are provided whereby turbulence and damage to the crop material are significantly reduced while the quantity, quality and uniformity of distribution of the crop delivered to the wagon in a given period of time is either equal or improved and clogging is avoided.

The advantages of the present invention are preferably attained by establishing a flow of air under pressure from a source through one or both of two regulated ducts respectively to the intake end of a foliage pick up and delivery chute, and upstream from the intake end to lift crop material from the ground and displace the same to the top of the wagon or harvester where it is discharged into a stack forming receptacle or crop harvesting vehicle. The present invention may take the form of a blower unit which rides upon the ground providing an inherent vibration effect alleviating crop clogging and may be elevated by the user for high speed travel. A novel eccentric tine pick up mechanism is also provided.

Accordingly, it is an object of the present invention to provide an improved air delivery foliage or crop wagon, which may be a crop harvester, and related methods.

Another object of the present invention is to provide an improved pneumatic foliage delivery system with the air impellers not coming in contact with any of the crop material transferred by the air system.

An additional object of the present invention is to provide methods and apparatus for reducing damage to the crop material during pneumatic transfer thereof from the ground to an elevated discharge site.

A further object of the present invention is to provide improved methods and apparatus for pneumatically picking up, displacing and discharging loose crop material into a wagon to form a stack therein, the quality and distribution of the crop being maintained during transfer.

Another object of the present invention is to provide methods and apparatus for greatly alleviating clogging of influent crop foliage at the intake end of an air delivery apparatus disposed at the front end of the stack forming wagon.

An additional paramount object is the provision of a pneumatic intake mechanism at the front end of the stack forming wagon wherein air under pressure may be delivered through one or both of two air ducts respectively to a site where hay or other crop is lifted from the ground at least partially by negative pressure into a chute, and thereafter to a second site where hay or other crop in the chute is further lifted to an elevated wagon discharge site.

It is also a primary object to selectively control and regulate the magnitude of air under pressure delivered from a source to one or both of two chute sites for lifting foliage along the chute into a stack forming vehicle or harvesting machine.

Another important object is the provision of a novel pneumatic foliage or crop intake mechanism comprising a blower arrangement which rides upon the earth when receiving crop and which can be lifted from the ground for more rapid travel.

A further object is the provision of a novel crop pick up mechanism.

These and other objects and features of the present invention will be apparent from the following detailed description, taken with reference to the accompanying drawings.

BRIEF DESCRIPTION OF THE DRAWINGS

FIG. 4 is a fragmentary vertical cross section of a second presently preferred air foliage delivery system;

FIG. 5 is an enlarged vertical cross section of a third presently preferred pneumatic foliage delivery system;

FIG. 6 is an enlarged fragmentary side elevational view of still another preferred air foliage delivery system according to the present invention; and FIG. 7 is a fragmentary enlarged side elevational view of a modified pick up mechanism.

DETAILED DESCRIPTION OF THE ILLUSTRATED EMBODIMENTS

Figure 1:
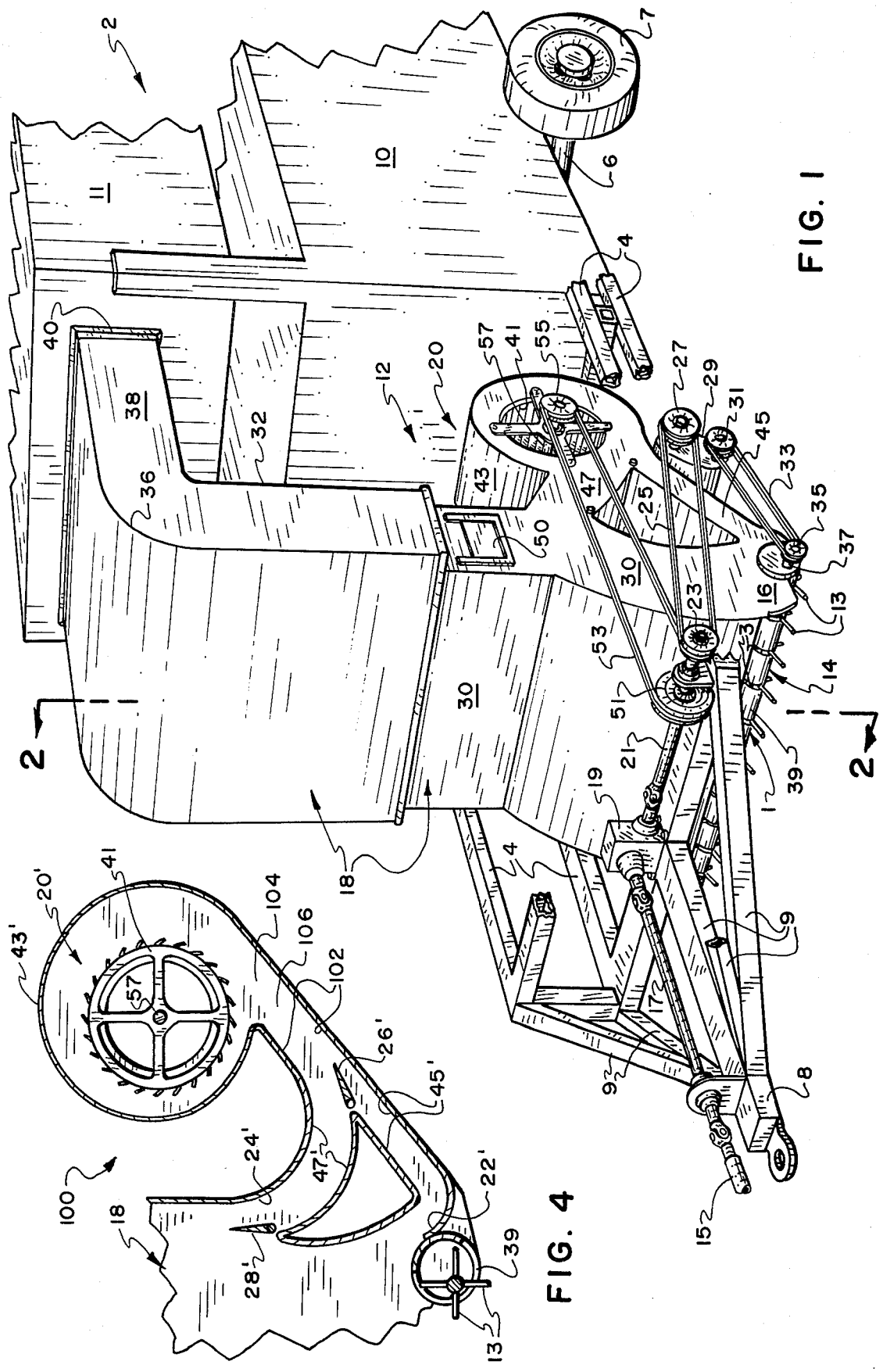
FIG. 1 is a fragmentary isometric view of a hay wagon embodying the presently preferred air foliage delivery system according to the present invention.
Figure 2:
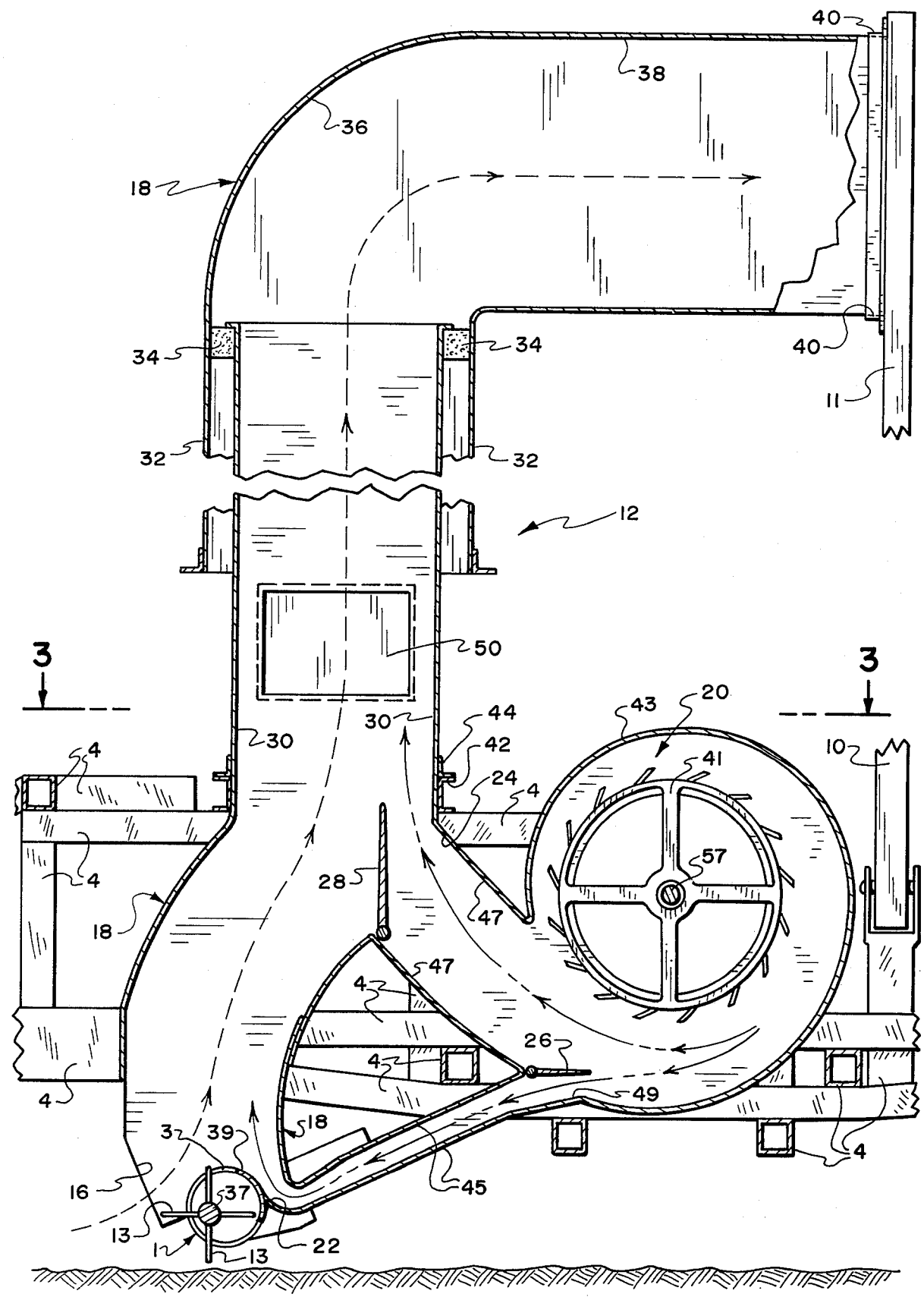
FIG. 2 is a vertical cross section taken along line 2—2 of FIG. 1.
Figure 3:
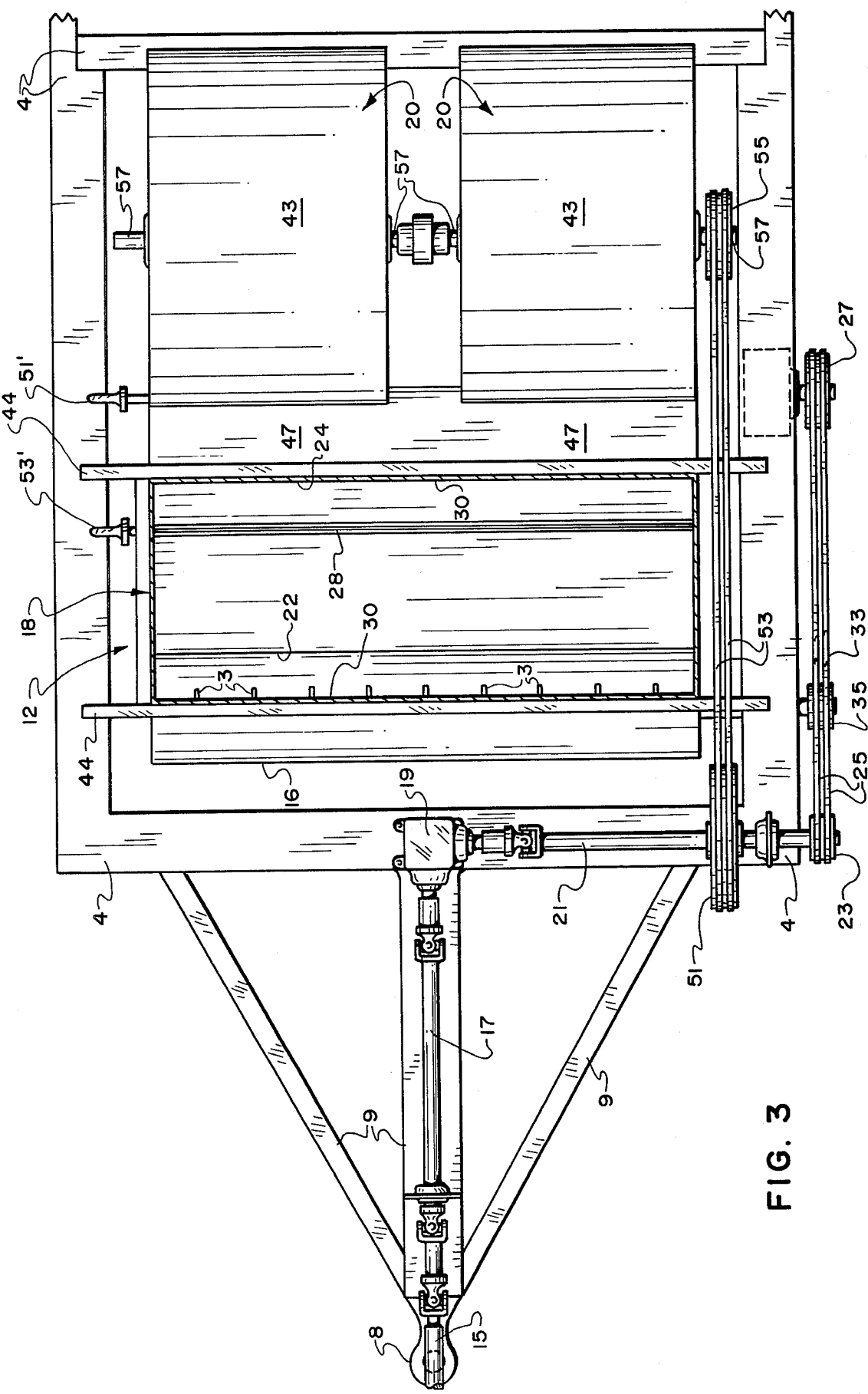
FIG. 3 is a horizontal cross sectional view taken along line 3—3 of FIG. 2.

In that form of the present invention chosen for purposes of illustration in FIGS. 1, 2 and 3, FIG. 1 shows a foliage wagon, indicated generally at 2, having a frame 4 carried by a suspension system 6, which supports wheels 7, the frame being provided with a suitable hitch 8 at the forward end of a tongue 9 for attachment to a tractor or the like, not shown. A receptacle 10, with side and front walls, is mounted on the frame 4 to receive foliage delivered thereto by a pneumatic foliage and/or crop delivery mechanism, indicated generally at 12. Foliage as used herein is intended to mean all forms of vegetation, at least a portion of which is edible, which are cut in the field and capable of bulk handling thereafter. Thus, hay, grass, soybean and grain, inter alia, comprise foliage. A compactor 11 is mounted above the receptacle 10. The suspension system 6 may be of the type shown and described in my copending patent application Ser. No. 117,574, filed Feb. 22, 1971, now U.S. Pat. No. 3,715,129. Any other suitable suspension system may, alternatively, be used. The details of suitable receptacles 10 and compactors 11 are shown and described in my copending U.S. patent application Ser. No. 195,709, filed Nov. 4, 1971 and Ser. No. 195,609, filed Nov. 4, 1971, now respectively U.S. Pat. Nos. 3,744,228 and 3,768,679, and U.S. Ser. No. 233,167, filed Mar. 9, 1972. Other appropriate receptacles and compactors may be used.

The pneumatic foliage delivery mechanism 12 comprises a pick up unit 1, an eccentric rotary rake 14 with tines 13 integral with a driven shaft 37, driven by the power take off 15 from the towing tractor generally within a hollow tube 39. The tube is anchored upon the mechanism 12 in a stationary position. The power take off 15 directly drives shaft 17, gear box 19 and shaft 21 to which a compound pulley 23 is non-rotatably attached to the end thereof. Rotation of compound pulley 23 likewise turns V-belts 25, pulley 27, gear mechanism 29 and pulley 31. As a consequence, V-belt 33 is likewise displaced causing the pulley 35 to rotate the tine shaft 37 eccentric in respect to the housing 39 whereby the tines, upon rotation, move through slots 3 in the tube 39 at essentially a one o'clock orientation to a position entirely within the tube or housing 39 freeing the tines from the lifted foliage. Thereafter, the tines 13 move downward and outward through slots 3 at about a five o'clock orientation. Thus, the rake 14 upon rotation of the tines 13 picks up the hay from the ground and flips the hay or other crop into the intake port 16 of the chute 18, which extends completely across the width of the wagon 2, where the hay is drawn by negative pressure up the chute into one or two streams of air. It is to be appreciated that a foliage cutting mechanism of conventional configuration and operation may be mounted at the influent end of the chute 18 either in addition to or in lieu of mechanism 1, where stacking of "green" foliage is desired. See FIG. 7.

As best seen in FIGS. 2 and 3, a pair of blowers 20 supply a high velocity flow of pressurized air from a squirrel cage source 41, confined by enclosing cylindrical housing 43, into the chute 18 at one or both of two separate air delivery discharge sites, i.e. at a discharge opening 22 disposed at the influent end 16 of the chute 18 and horizontally adjacent the two blower sites 20 generally upward into the chute 18 at opening 24. The air from the two blower sites 20 is therefore selectively available across essentially the entire width of the wagon at both discharge sites 22 and 24 being conveyed thereto by elongated air chambers 45 and 47 respectively. As can be seen by observation of FIG. 2, the air flow through channel 45 initially is essentially horizontal and becomes essentially vertical at discharge opening 22, thereby creating a negative pressure region in the vicinity of the pick up unit 1 the magnitude of which is varied depending on the amount of air released into the chute 18 at channels 45 and 47. Air discharged at opening 22 materially aids in stripping of any residual foliage or crop from rotating tines 13. Likewise, air discharge through channel 45 is essentially horizontal, becomes generally horizontal with a downward component and is deflected at discharge opening 22 into an upward direction. A pair of dampers 26 and 28 are rotatably carried by the pneumatic foliage delivery mechanism 12 respectively adjacent the intake opening 49 of the channel 45 and the discharge opening 24 of the channel 47. By manually selectively setting handles 51' and 53' (FIG. 3) respectively, the dampers may be positioned so as to regulate the magnitude of air discharge through the openings 22 and 24 anywhere from a magnitude of zero to a maximum respectively. It has been found, that various types of foliage and diverse moisture rates within a given species of foliage dictate that the air flow pattern and the magnitude of discharge from either site 22 and 24 be altered substantially to elevate the foliage along the chute 18 into the wagon receptacle 10 so as to maintain essentially uniform distribution of leaves and stalk, for example, when hay is being gathered and to avoid detachment of the leaves from the remainder of the plants being stacked in the receptacle 10.

As can be seen in FIG. 1, an additional double pulley 51 is non-rotatably mounted upon shaft 21, which is driven by the power take off 15, as previously mentioned. The double pulley 51 drives V-belts 53 thereby turning an additional pulley 55 and rotating the blower shaft 57, each squirrel cage 41, being non-rotatably mounted upon said shaft 57. Thus, rotation of shaft 21 in turn rotates both squirrel cages 41.

It is to be appreciated that the chute 18 comprises upper and lower telescopically related sections 30 and 32, respectively, the telescopic relation being shown in its contracted position in FIG. 2. The upper portion 32 is sealed against air loss by seals 34, which accommodate the vertical reciprocation of the top section 32 downward and upward in respect to the lower section 30. The upper section 32 comprises an elbow 36 and a horizontal extension 38, which attaches to the compactor 11 at anchor sites 40 in sealed relation so that air and foliage discharge essentially horizontally below the top of the compactor 11 into the receptacle 10, accumulator means being selectively interposed between the accumulator 11 and the receptacle 10 for accumulating foliage therein when the compactor is down compressing the stack of hay in the receptacle 10, in a manner heretofore known in the art. It is preferred that the walls of the sections 30 and 32 gradually increase in cross sectional area along the length thereof to reduce damage to the foliage through separation of the leaves from stems, and improve the air flow characteristics thereof, etc. In some instances, it may be necessary or desirable to interpose three or more telescopic chute sections between the influent end 16 and the discharge site 40, depending primarily upon the dimensions of the wagon 2. In the illustrated embodiment, the lower section 30 of the chute 18 is stationarily anchored by structural members 42 and 44 to the frame 4 of the wagon 2.

In use, for the purpose of creating stacks of loose foliage in the receptacle 10 following which the stacks are conventionally discharged, the tractor pulls the loose foliage wagon 2 along a field having cut foliage disposed upon the ground, usually in a windrow. Actuation of the power take off 15 of the tractor, causes the two squirrel cages 41 to rotate thereby discharging from the blower housings 43 across essentially the entire width of the pneumatic foliage delivery mechanism 12 a continuous stream of air under pressure at discharge sites 22 and 24 respectively having an instantaneous discharge directly proportional to the settings made by the operator of the dampers 26 and 28 respectively, which also determines the magnitude of vacuum created at the foliage pick up site. Obviously, the flow may be divided between the two channels 45 and 47 or directed entirely along one or the other channel. The settings may be varied by trial and error depending upon the nature of the foliage being dealt with and particularly the moisture content thereof. The operator will be able within a very brief period of time to ascertain by visual observation through the window 50 in the lower section 30 of the chute 18 the optimum settings for the dampers for any particular foliage being dealt with. As foliage conditions change during the course of the day, adjustments may be readily made. Thus, during ordinary operation when the air discharge from the blower housings 43 is split, air at opening 22 displaces foliage, lifted by the tines 13 of the rake 14 and the negative pressure at the pick up site, and lifts the same across the full width of the chute 18 in a generally vertical direction up from the pick up site to the discharge opening 24 where the additional air displaces the foliage in a continuous fashion along the chute 18 discharging the same from the site 40 through the compactor 11, which may also have accumulator capability, into the receptacle 10. From time to time, the compactor 11 will be lowered into contiguous compressing relation with the loose foliage disposed within the receptacle 10 to produce a compacted stack. The chute 18 contracts and expands with the displacement of the compactor 11 without interfering with the continuous delivery of foliage through the chute. Laminar flow is maintained along the entire length of the chute 18 and since the chute 18 is essentially disposed across the full width of the mechanism 2, no clogging results and no foliage is retained within the chute during operation. The vertical lift directly up from the pick up site minimizes the impact of the foliage against the sides of the chute contributing to an end result of uniform high quality and even distribution of foliage throughout the entire stack within the receptacle 10.

It is to be understood that the power take off 15 is susceptible of various speeds so that the rate of lifting of foliage is commensurate with preservation of leafs intact with stalks, etc. Gradual expansion of the cross sectional area of the chute 18 also aids in improved hay quality within the stack.

Reference is now made to FIG. 4 which depicts a second presently preferred air foliage delivery system 100 shown in fragmentary vertical cross section. The system 100 is identical to the system comprised in conjunction with FIGS. 1–3 with the exception of the following description. The squirrel cage source 41, mounted upon shaft 57 for joint rotation, is circumscribed by an enclosing cylindrical housing 43, the effluent opening 104 being disposed essentially directly below the squirrel cage 41. Air displaced from the housing 43 through the effluent opening 104 passes along a channel 106 which comprises side walls 102 and is essentially the full width of the hay wagon to which the foliage delivery system 100 is adapted to be attached. The chamber 106 is bifurcated into upper and lower channels defined by side walls 47' and 45', respectively. Dampers 28' and 26', substantially identical to the previously described dampers control the percentage of division of air flow from channel 106 into the bifurcated passages, the channels defined by walls 47' and 45' serving the same functions, respectively as the channels 45 and 77 heretofore described. It has been found that the utilization of a common channel to which air is readily displaced from the squirrel cage provides improved air distribution capability at the bifurcation.

Reference is now made to FIG. 5 which depicts a third presently preferred air foliage delivery system 200 shown in fragmentary vertical cross section. The system 200 is identical to the system described in conjunction with FIGS. 1–3, with the exception of the following description.

The chute 218 is shown to possess a flared end portion 220, which is anchored to the frame by transverse frame member 222 and at angular ended portion 224 by transverse member 225. Thus, the illustrated portion of chute 218 is stationary in the illustrated position, being supported there by a rigid connection to the frame 4.

The receptacle 10 is identical to the early receptacle with the exception that it possesses a downwardly depending integral lug 228 each comprising an eye 230. The pick up mechanism 232 comprises two squirrel cage sources 241 disposed in the same tandem relation upon shaft 257 as previously described, each squirrel cage source 241 being enclosed within a cylindrical housing 243, which possesses a downwardly and leftwardly extending channel 202 comprising passageway 206. A damper 226, pivotal with shaft 227, is rotatably disposed across the passageway 206 adjacent flange 229 for manual selective setting as hereinbefore set forth.

The blower shaft 257 is journaled upon conventional bearings, which in turn are carried in a suitable housing anchored to the frame 4. Thus, the shaft 257 is available for rotation of the squirrel cage sources 241. The cylindrical blower housings 243 are not anchored to the frame but float upon the shaft 257, being connected by support members 250 to a boss 261, which rotatably receives the shaft 257. Bias lugs 263 and 265 respectively project integrally from the boss 261 upwardly and downwardly. Abutment plate 267 and anchor plate 269 are each attached by welding or the like to the lugs 263 and 265 respectively for the purpose of imposing a bias and counter bias upon the pick up unit 232. Anchor plate 269 comprises an aperture through which eye bolt 273 loosely passes, being there secured by a nut 275 upon the threaded end of the eye bolt 273. A tension spring 279 is anchored to the eye 283 the other end of spring 279 being connected in tensile condition at eye 230 of receptacle lug 228. Thus, a counterclockwise bias is exerted upon each pickup unit 232 about the shaft 257.

A lever arm 290 is pivotally joined to the chute 218 at pivot pin 291 and provides an elevated abutment plate 292 against which one end of the compression spring 277 applies force. The other end of spring 277 rests against plate 267, the spring being retained against inadvertent lateral removal by retainer studs 275 each integral with one of the plates 267 and 292 respectively. The compression spring 277 exerts a variable clockwise bias upon the housing 243 about the shaft 257, the magnitude of the bias depending on whether or not air pressure is being exerted upon damper 294.

The damper 294 is non-rotatably associated with the pivot shaft 291 such that the lever 290 and damper 294 move in unison about the pivot point 291. The value of the springs 277 and 279 are selected and the spring 279 adjusted using eye bolt 273 so as to normally bias (in the absence of blower pressure) the pick up unit 232 clockwise about the shaft 257 into the dotted line position illustrated within the chute 218. When the blowers are on, the air pressure from the blowers will strike and deflect into a more erect condition the damper 294 and lever 290 causing a counterclockwise rotation of the entire pick up unit 232 about the shaft 257 until a lower support wheel 300 engages the ground. This position is illustrated in solid lines in FIG. 5.

Flange 301 of a forward bifurcated effluent section 302 is integrally attached to the flange 229 of chamber 202 across the full width of the wagon and provides chambers 245 and 247, respectively. Chambers 245 and 247 provide effluent ports 304 and 306, respectively. The chamber 202 and channels 245 and 247 function substantially as earlier described in conjunction with the previous embodiments.

The effluent blower portion 302 comprises side plates 308, which taken together define an open foliage influent port and comprise front edge 310 and top edge 312. The shaft 37 of the pick up unit 1 is journaled to each plate 308 for driven rotation in the manner previously described. A bottom plate 314 rotatably carries the wheel 300 for ground engagement. Thus, the pick up unit 232 is vibrated or displaced as the wheel 300 rolls across irregular ground, which materially assists in preventing clogging and in facilitating continuous displacement of foliage of the chute 218 into the receptacle 10.

When the gathering of foliage has been completed and it is desired to move the hay wagon more rapidly from one place to another either across a field or along an existing roadway, the blowers are deenergized and the bias/counter bias mechanisms described above, which comprise springs 277 and 279, exert a resultant clockwise rotation upon the entire pick up unit 232 elevating it to the dotted position of FIG. 5 where the top edge 312 of each plate 308 is disposed entirely within the chute 218.

Reference is now made to FIG. 6, which depicts in fragmentary side elevation part of another preferred embodiment of the present invention specifically disclosing an air foliage delivery system 330. The system 330 is substantially identical to the system 200 of FIG. 5, previously described, with the exception of the following description.

In lieu of previously described lever 290, lever 332 is mounted upon pivot pin 291 so as to rotate in unison with the previously described damper 294. Lever 332 defines an aperture 334 near its distal end.

A pair of opposed L-shaped brackets 336 (only one of which is shown) support the squirrel cage sources 241 and the cylindrical housings 243 upon the shaft 257, the lower leg 338 of each bracket 336 being welded or otherwise suitably anchored to one of the frame members 9 as shown. The shaft 257 is carried within an aperture 340 of each bracket 336, which a sleeve bushing 342 interposed between the wall of the aperture 340 of the shaft 257 to facilitate anti-frictional rotation of the shaft 257 and the squirrel cage sources 241.

The cylindrical housings 243 are carried by two opposed supports 344, only one of which is shown. Each support 344 extends essentially parallel to the axis of the foliage vehicle and is bolted at 346 to the adjacent cylindrical housing 243. Each support 344 is rotatably joined to the shaft 257. Thus, the load supported by brackets 344 is transferred through the ends of the shaft 257 and the brackets 336 to the vehicle frame. At the same time, when the effluent blower portion 302 rotates from an elevated position partially within the chute 218 to a lower pick up position (in the manner previously described in conjunction with FIG. 5), each support 344 accommodates the required corresponding rotation of the cylindrical housings 243.

A clockwise bias is exerted upon the cylindrical housings 243 and the blower effluent portion 302 by a tension spring 350. This spring spans between (a) the eye 352 (which receives end 351 of spring 350) of a lug 354, which lug is welded or otherwise secured to the receptacle 10, and (b) a second lug 356. Lug 356 is fixed in position by reason of being welded to an anchor plate 358 which is in turn bolted at 360 to the adjacent cylindrical housing 243. The anchor plate 356 projects at a 90° angle outward from the plate 358. Lug 356 is apertured and loosely receives the threaded shaft 366 of an eye bolt 362, a nut 364 being threadedly secured to the end 366 with the end 368 of spring 350 fitted through the eye 370 of the bolt 362.

In like manner, the tension spring 380 exerts a counterclockwise bias upon the cylindrical housings 243 and the blower effluent portion 302. Preferably, the mentioned counterclockwise moment created by spring 380 is less than the clockwise moment created by spring 350, but of a sufficient magnitude so that the counterclockwise moment created by spring 380, when added to the moment created by air under pressure striking damper 294 will exceed the opposite moment created by spring 350. In this way, the cylindrical housings 243 and blower effluent portion 302 will move between the two mentioned positions depending upon whether or not air under pressure is being generated.

Spring 380 is held in the illustrated position by one end 382 passing through the aperture 334 in lever 332 and the other end 384 passing through the eye 386 of eye bolt 388, eye bolt 388 being secured through an outwardly projecting lug 390 by a nut 392 threaded upon the end 394 of the eye bolt 388. Naturally, the exact magnitude of the clockwise and counterclockwise moments created by spring 350 and 380 may be adjusted by repositioning the bolts 364 and 392, respectively, along the threaded ends 366 and 394 of the eye bolts 362 and 388. Otherwise, the embodiment of FIG. 6 is identical to and functions as does the embodiment described in conjunction with FIG. 5.

Reference is now made to FIG. 7 which depicts a varied form of pick up mechanism, generally designated 400. In this case, the blower mechanism, only portion 302 of which is shown, may be of the type described in conjunction with either FIG. 5 or FIG. 6 and has been so numbered. Thus, when the blower is "on," the wheel 300 will engage the ground and roll therealong as foliage or crop is introduced into the system. A cutting mechanism, generally designated 402 is mounted upon power driven shaft 404 in a non-rotatable fashion so as to extend across the entire width of the pick up site and so as to be rotated, through actuation by suitable drive mechanisms of conventional design usually comprising part of the take-off of a tractor, in a clockwise direction as viewed in FIG. 7, when the tractor take-off drive shaft 15 is rotated. The cutting mechanism 402 comprises a plurality of spokes 406 to which cutting blades 408 are mounted. Rotation of the cutting mechanism 402 in a clockwise direction as the vehicle is advanced will cause the cutting blades to strike standing foliage or crop, cutting the same and lifting the cut foliage or crop into the chute where the blower system displaces the same into the receptacle. If desired, the cutting mechanism 402 may be fabricated in accordance with the cutting mechanism disclosed in U.S. Pat. No. 2,758,435 which issued Aug. 14, 1956.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A wagon for receiving loose foliage to create a stack therefrom comprising:
   a receptacle movable along the ground in a field upon ground-engaging means;
   a mechanism carried at the front end of the receptacle for picking up foliage from the ground, and elevating and depositing the picked up foliage in the receptacle, the mechanism comprising:
      a chute, unobstructed by any mechanical foliage lifting mechanism, comprising an elevated discharge section from which foliage is discharged into the receptacle, a central vertically directed portion and a foliage influent end immediately above the ground, at which end foliage is lifted from the ground into the chute;
      blower means, adjacent but offset from the influent end of the chute, by which air under pressure is obtained;
      first air discharge means operable to communicate air under pressure from the blower means to a first location at the foliage influent end juxtaposed the ground;
      second air discharge means operable to communicate air under pressure from the blower means to another chute location substantially above the first location;
      means selectively controlling the magnitude of respective air flow from the first discharge means and the second discharge means.

2. The wagon of claim 1 wherein said selectively controlling means comprise first and second selectively settable damper means respectively controlling the air flow rate of air discharged from the first discharge means and from the second discharge means, each between the limits to zero to maximum.

3. The wagon of claim 1 wherein said first discharge means comprise means directing air flow therefrom in an upward direction into the chute creating a negative pressure region at the foliage influent end and wherein said second discharge means comprise means directing air therefrom into the chute in an upward direction.

4. The wagon of claim 1 wherein the foliage influent end of the chute is substantially directly below the central portion of the chute.

5. The wagon of claim 1 wherein the central portion of the chute comprises at least two telescopically related sections.

6. The wagon of claim 1 wherein the chute width is substantially the same as the receptacle width.

7. The wagon of claim 1 wherein said first and second air discharge means comprise bifurcated flow manifold wherein a single stream of air emerges from the blower means and is subdivided by the selectively controlling means into two streams at a location a substantial distance downstream of the blower means but upstream of the chute.

8. The wagon of claim 1 wherein the pick up means comprise a power-rotated cutting mechanism which severs standing foliage and displaces the severed foliage toward the chute means.

9. The wagon of claim 1 further comprising a power-rotated tine pick up mechanism adjacent the ground generally below the foliage influent of the chute whereby the rotating tines are purged of any residual foliage by air issuing from the first air discharge means.

10. A method of creating a stack of foliage in a wagon comprising the steps of:
    picking up foliage from the ground;
    elevating the picked up foliage into and along a generally vertically extending chute by displacing air under pressure from a source to the pick up site adjacent the ground;
    introducing additional air under pressure into the chute at a site an appreciable distance above the elevating site thereby continuing to lift the elevated foliage within the chute;
    discharging the lifted foliage from the top of the chute into a receptacle;
    establishing at least one setting of a first variable setting air flow control mechanism to thereby define the rate of air flow to the elevating site;

establishing at least one setting of a second variable setting air flow control mechanism to thereby define the rate of air flow to the pick up site.

11. A wagon for receiving loose foliage comprising:
a receptacle movable as part of the wagon across ground;
chute means mounted adjacent the front of the receptacle for receiving picked up foliage and transmitting said foliage into the receptacle;
a multiple position displaceable pick up mechanism carried at the front of the receptacle adjacent the influent end of the chute means, said pick up mechanism comprising rotary rake means for lifting foliage from the ground into the chute means, separate blower means by which air under pressure is obtained and duct means by which said air under pressure is discharged into the chute means said duct means comprising passageway means for directing air to ground level and thence into said chute means;
means for displacing the pick up mechanism from an elevated remote position to a ground position at which foliage may be lifted from the ground and into the chute means;
means for displacing the pick up mechanism to said remote position well above the ground to accommodate relatively rapid travel of the wagon.

12. A wagon as defined in claim 11 wherein the duct means of the pick up mechanism comprises:
second air passageway means operable to communicate air under pressure from the blower means to another chute location above the first chute location, when the pick up mechanism is in the pick up position.

13. A wagon as defined in claim 12 wherein the pick up mechanism further comprises means selectively controlling the magnitude of air flow, respectively, from the first and second passageway means.

14. A wagon according to claim 11 wherein said pick up mechanism comprises means rotatably mounting the mechanism to the wagon as a unit and first bias means rotatably biasing the mechanism in one direction toward the pick up position and second bias means oppositely rotatably biasing the mechanism toward the travel position, said two bias means being selectively settable to place the pick up mechanism in either of said positions.

15. A wagon according to claim 14 wherein said first bias means comprises a damper against which air under pressure impinges when the blower means are activated causing the pick up mechanism to assume the pick up position.

16. A wagon according to claim 11 wherein the pick up mechanism comprises tine means for lifting foliage from the ground.

17. A wagon according to claim 20 wherein each said bias means comprise a spring mechanism creating oppositely directed moments upon the pick up mechanism.

18. A wagon according to claim 11 wherein the chute means and the pick up mechanism are physically separate and wherein the duct means of the pick up mechanism a male end from which air from the blower means is discharged into the chute means and wherein the adjacent chute means comprises a female opening, the male end and female openings being sized and shaped to accommodate movement of the male end freely into the female opening when the pick up mechanism is in the travel position.

19. A wagon for receiving loose foliage comprising:
a receptacle movable as part of the wagon across the ground;
chute means mounted adjacent the front of the receptacle for receiving picked up foliage and transporting said foliage into the receptacle;
a pick up mechanism carried adjacent the influent end of the chute means, said pick up mechanism comprising blower means by which air under pressure is obtained and channel means by which said pressurized air is transmitted to and discharged into said chute means;
means for lowering and elevating the channel means respectively into a relatively low ground position for picking up foliage from the ground for placement in the receptacle and into an elevated position remote from the ground for relatively rapid travel of the wagon.

* * * * *

UNITED STATES PATENT OFFICE
CERTIFICATE OF CORRECTION

PATENT NO. : 3,898,786
DATED : August 12, 1975
INVENTOR(S) : Ezra Cordell Lundahl It is certified that error appears in the above-identified patent and that said Letters Patent are hereby corrected as shown below:

Column 6, line 68, the number "250" should read --259--

Claim 17, line 1, "claim 20" should read --claim 18--

Signed and Sealed this eleventh Day of November 1975

[SEAL]

Attest:

RUTH C. MASON
Attesting Officer

C. MARSHALL DANN
Commissioner of Patents and Trademarks